United States Patent
Yang et al.

(10) Patent No.: US 11,635,997 B2
(45) Date of Patent: Apr. 25, 2023

(54) DATAFLOW OPTIMIZATION APPARATUS AND METHOD FOR LOW-POWER OPERATION OF MULTICORE SYSTEMS

(71) Applicant: AJOU UNIVERSITY INDUSTRY-ACADEMIC COOPERATION FOUNDATION, Suwon-si (KR)

(72) Inventors: Hoeseok Yang, Suwon-si (KR); Hyeonseok Jung, Suwon-si (KR)

(73) Assignee: AJOU UNIVERSITY INDUSTRY-ACADEMIC COOPERATION FOUNDATION, Suwon-si (KR)

(*) Notice: Subject to any disclaimer, the term of this patent is extended or adjusted under 35 U.S.C. 154(b) by 607 days.

(21) Appl. No.: 16/509,568

(22) Filed: Jul. 12, 2019

(65) Prior Publication Data

US 2020/0174849 A1    Jun. 4, 2020

(30) Foreign Application Priority Data

Nov. 30, 2018    (KR) .................. 10-2018-0151699

(51) Int. Cl.
| | | |
|---|---|---|
| G06F 9/50 | (2006.01) | |
| G06F 9/48 | (2006.01) | |
| G06F 9/30 | (2018.01) | |
| G05D 1/10 | (2006.01) | |
| B64C 39/02 | (2023.01) | |
| G05D 1/00 | (2006.01) | |
| B64U 101/00 | (2023.01) | |

(52) U.S. Cl.
CPC .......... *G06F 9/5094* (2013.01); *G06F 9/3005* (2013.01); *G06F 9/4881* (2013.01); *B64C 39/024* (2013.01); *B64U 2101/00* (2023.01); *G05D 1/0088* (2013.01); *G05D 1/1064* (2019.05)

(58) Field of Classification Search
CPC .... G06F 9/5094; G06F 9/3005; G06F 9/4881; G05D 1/1064; G05D 1/0088; B64C 39/024; B64C 2201/12
See application file for complete search history.

(56) References Cited

U.S. PATENT DOCUMENTS

2015/0169303 A1* 6/2015 Zhao ...................... G06F 8/443
                                                       717/160

OTHER PUBLICATIONS

Schor et al. "Scenario-based design flow for mapping streaming applications onto on-chip many-core systems" Proceedings of the 2012 international conference on Compilers, architectures and synthesis for embedded systems., pp. 71-80 (Year: 2012).*

(Continued)

*Primary Examiner* — Meng Ai T An
*Assistant Examiner* — Willy W Huaracha
(74) *Attorney, Agent, or Firm* — Sughrue Mion, PLLC

(57) ABSTRACT

The present disclosure relates to a dataflow optimization method for low-power operation of a multicore system, the dataflow optimization method including: a step (a) of creating an FSM including a plurality of system states in consideration of dynamic factors that trigger a transition in system states for original dataflow; and a step (b) of optimizing the original dataflow through optimization of the created FSM.

8 Claims, 11 Drawing Sheets

(56) References Cited

OTHER PUBLICATIONS

Lee, Chanhee, Sungchan Kim, and Soonhoi Ha. "Efficient run-time resource management of a manycore accelerator for stream-based applications." The 11th IEEE Symposium on Embedded Systems for Real-time Multimedia, pp. 51-60. (Year: 2013).*

Nguyen et al. "Optimal Power Control and Load Balancing for Uplink Cell-Free Multi-User Massive MIMO" IEEE access 6 (2018), pp. 14462-14473. (Year: 2018).*

Skelin, Mladen, et al. "Model checking of finite-state machine-based scenario-aware dataflow using timed automata." 10th IEEE International Symposium on Industrial Embedded Systems (SIES). IEEE, [hd/ 1-10 (Year: 2015).*

L. Schor et al, "Scenario-based design flow for mapping streaming applications onto on-chip many-core systems.", In Proceedings of the 2012 international conference on Compilers, architectures and synthesis for embedded systems, p. 71-80. ACM, 2012.

Hyeonseok Jung, "Context-Aware Dataflow Adaptation Technique for Low-Power Multi-Core Embedded Systems", Jun. 24, 2018, Paper Presentation by inventor.

* cited by examiner

FIG.10

| QCPM | | | | | | | | | |
|---|---|---|---|---|---|---|---|---|---|
| | | Avg. power [Watts] | | | | Σ#pixels/#frames | | | |
| | | Stereo Vision | #10 | #50 | #100 | Stereo Vision | #10 | #50 | #100 |
| QoS levels | $l_1$ | 0.47 | 0.49 | 0.51 | 0.54 | 153,600 | 153,600 | 153,600 | 153,600 |
| | $l_2$ | 0.56 | 0.68 | 0.67 | 0.69 | 221,184 | 221,184 | 221,184 | 221,184 |
| | $l_3$ | 0.76 | 1.77 | 1.62 | 1.71 | 307,200 | 307,200 | 307,200 | 307,200 |
| | $l_4$ | 3.30 | 2.56 | 2.10 | 2.57 | 576,000 | 576,000 | 576,000 | 576,000 |
| | $l_5$ | 4.08 | 3.38 | 3.15 | 4.23 | 614,400 | 614,400 | 614,400 | 614,400 |
| Proposed | | 1.74 | 1.76 | 1.59 | 1.98 | 331,903 | 371,891 | 370,856 | 375,063 |

(a)

| PCQM | | | | | | | | | |
|---|---|---|---|---|---|---|---|---|---|
| | | Avg. power [Watts] | | | | Σ#pixels/#frames | | | |
| | | Stereo Vision | #10 | #50 | #100 | Stereo Vision | #10 | #50 | #100 |
| Power Budget | 0.5 | 0.47 | 0.49 | 0.51 | 0.54 | 153,600 | 153,600 | 153,600 | 153,600 |
| | 2.0 | 0.76 | 0.68 | 0.67 | 0.69 | 307,200 | 307,200 | 307,200 | 307,200 |
| | 3.0 | 2.11 | 1.77 | 1.62 | 1.71 | 393,216 | 393,216 | 393,216 | 393,216 |
| | 4.0 | 3.30 | 2.56 | 2.10 | 2.57 | 576,000 | 576,000 | 576,000 | 576,000 |
| | 4.5 | 4.08 | 3.38 | 3.15 | 4.23 | 614,400 | 614,400 | 614,400 | 614,400 |
| Proposed | | 1.98 | 1.73 | 1.62 | 2.01 | 380,955 | 405,418 | 406,565 | 405,539 |

(b)

DATAFLOW OPTIMIZATION APPARATUS AND METHOD FOR LOW-POWER OPERATION OF MULTICORE SYSTEMS

CROSS-REFERENCE TO RELATED APPLICATIONS

This application claims the priority of Korean Patent Application No. 10-2018-0151699 filed on Nov. 30, 2018, in the Korean Intellectual Property Office, the disclosure of which is incorporated herein by reference.

BACKGROUND

Field

The present disclosure relates to a dataflow optimization apparatus and method for low-power operation of a multicore system. In particular, the present disclosure relates to a dataflow optimization apparatus and method that provides a context-aware dataflow adaptation method for low-power operation of an image processing system (multicore embedded system) for an unmanned flying object to avoid obstacles.

Description of the Related Art

Due to continuously increasing computational demands, recently, multicore processors are generally used in embedded or cyber-physical systems.

In multicore embedded system design, it is important to determine a method of distributing workloads to multiple cores, which is a so-called mapping optimization.

Conventionally, such a mapping decision is made at the time of design on the basis of the assumption that a system status such as execution time of a specific task or a power supply does not change. However, complexity and the abstraction level of design become increasingly high, this assumption is no longer effective.

As factors causing this change, there are dynamic workload characteristics of physical processes, various execution modes of software, various power budgets, tradeoff between an execution time and a resultant quality, etc. Since these are in close connection with input stimuli or operation conditions, it may be considered as being actually impossible to accurately catch this dynamic effect in conventional design time optimization.

Accordingly, there is a need for a technology that can design a multicore system systematically in consideration of dynamic factors that trigger considerable changes in a system status.

There is, for example, [L. Schor, I. Bacivarov, D. Rai, H. Yang, S.-H. Kang, and L. Thiele. Scenario-based design flow for mapping streaming applications onto on-chip many-core systems. In Proceedings of the 2012 international conference on Compilers, architectures and synthesis for embedded systems, pages 71-80. ACM, 2012 as a technology for processing runtime adaptive mapping of a dataflow-based multicore system.

This document proposes a scenario-based multicore system design and optimization framework, and in this document, execution modes have been designated in various states of an FSM (finite state machine). Further, other sets of dataflow applications are activated in the respective states in the document.

However, the work of the document is necessarily accompanied by a constraint that a designer has to explain all possible execution scenarios of an FSM, so there is a problem that a solution cannot be expanded into fine-grained specifications. Further, the performance improvement level of mapping optimization is insufficient.

SUMMARY

The present disclosure has been made in an effort to solve the problems in the related art and an object of the present disclosure is to provide a dataflow optimization apparatus and method for low-power operation of a multicore system as a dataflow-based multicore embedded system design technology that systematically considers dynamic factors that trigger a considerable transition of a system state.

However, the objects to be achieved by embodiments of the present disclosure are not limited to the object described above and there may be other objects.

As an aspect for achieving the objects described above, a dataflow optimization method for low-power operation of a multicore system according to an embodiment of the present disclosure may include: a step (a) of creating an FSM including a plurality of system states in consideration of dynamic factors that trigger a transition in system states for original dataflow; and a step (b) of optimizing the original dataflow through optimization of the created FSM.

Further, the dynamic factors are factors about at least one of a QoS change and a power budget change in the step (a).

Further, the step (a) may create system states included in an FSM as many as the number of QoS levels when the type of an optimization problem is QCPM (QoS-Controlled-Power-Minimization), and may create system states included in the FSM as many as the number of power budget levels when the type of an optimization problem is PCQM (Power-Constrained-QoS-Maximization).

Further, the step (a) may create the FSM such that a state transition is possible between adjacent systems under the assumption that the plurality of system states included in the FSM is sequentially arranged in accordance with a QoS level and/or a power budget level.

Further, the step (b) may include: a step (b1) of mapping each of a plurality of tasks corresponding to the created FSM to at least one core of multiple cores; and a step (b2) of scheduling the tasks mapped to the multiple cores to satisfy predetermined conditions.

Further, in the step (b2), the predetermined conditions may be conditions that minimize power consumption when the type of an optimization problem is QCPM (QoS-Controlled-Power-Minimization), and may be conditions that maximize a QoS level in association with a power budget when the type of an optimization problem is PCQM (Power-Constrained-QoS-Maximization).

Further, the predetermined conditions in the step (b2) may further include a condition that sets latency to be a predetermined time or less in parallelism of the tasks scheduled through the multiple cores.

Further, the dataflow optimization method for low-power operation of a multicore system according to an embodiment of the present disclosure may further include a step (c) of providing a response to a change in system state on the basis of the original dataflow optimized in the step (b).

Meanwhile, a dataflow optimization apparatus for low-power operation of a multicore system according to an embodiment of the present disclosure may include: a creating unit creating an FSM including a plurality of system states in consideration of dynamic factors that trigger a transition in system states for original dataflow; and an optimizing unit optimizing the original dataflow through optimization of the created FSM.

Further, the creating unit may create the FSM such that a state transition is possible between adjacent system states under the assumption that the plurality of system states included in the FSM is sequentially arranged in accordance with a QoS level and/or a power budget level.

Further, the optimizing unit may map each of a plurality of tasks corresponding to the created FSM to at least one core of multiple cores, and schedule the tasks mapped to the multiple cores to satisfy predetermined conditions.

The aspects are only examples and should not be construed as intending to limit the present disclosure. Additional embodiments to the drawings and the detailed description may exist other than the exemplary embodiments described above.

According to the aspects of the present disclosure, it is possible to provide a dataflow optimization apparatus and method for low-power operating a multicore system as a dataflow-based multicore embedded system design technology that systematically considers dynamic factors that trigger considerable transitions in system status.

According to the aspects of the present disclosure, it is possible to provide a dataflow optimization apparatus and method for low-power operating a multicore system (multicore embedded system) as a context-aware dataflow adaptation technique that enables low-power operation of an image processing system (multicore embedded system) for an unmanned flying object to avoid obstacles.

However, effects that can be obtained in the present disclosure are not limited to the effects described above and other effects may exist.

BRIEF DESCRIPTION OF THE DRAWINGS

The above and other aspects, features and other advantages of the present disclosure will be more clearly understood from the following detailed description taken in conjunction with the accompanying drawings, in which:

FIG. 10 is a diagram showing a comparison of adaptation methods for fixed mode execution in QCPM and PCQM as an experimental example of the present disclosure.

DETAILED DESCRIPTION OF THE EMBODIMENT

Figure 1:
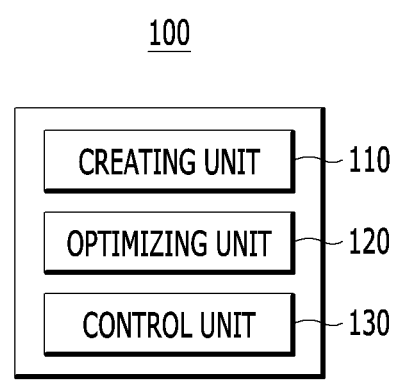
FIG. 1 is a block diagram showing a schematic configuration of a dataflow optimization apparatus for low-power operation of a multicore system according to an embodiment of the present disclosure.

Embodiments of the present disclosure are described hereafter with reference to the accompanying drawings for those skilled in the art to be able to easily achieve the present disclosure. However, the present disclosure may be achieved in various different ways and is not limited to the embodiments described herein. Further, in the accompanying drawings, components irrelevant to the description will be omitted in order to obviously describe the present disclosure, and similar reference numerals will be used to describe similar components throughout the specification.

When an element is referred to as being "connected with" another element, it may be "directly connected" to the other element and may also be "electrically connected" or "indirectly connected" to the other element with another element intervening therebetween.

Throughout the present specification, when a member is disposed "on", "at the upper portion" "at the upper end", "under", "at the lower portion", and "at the lower end", it may be disposed not only in contact with another member, but with another member between the two members.

Through the present specification, unless explicitly described otherwise, "comprising" any components will be understood to imply the inclusion of other components rather than the exclusion of any other components.

Figure 2:
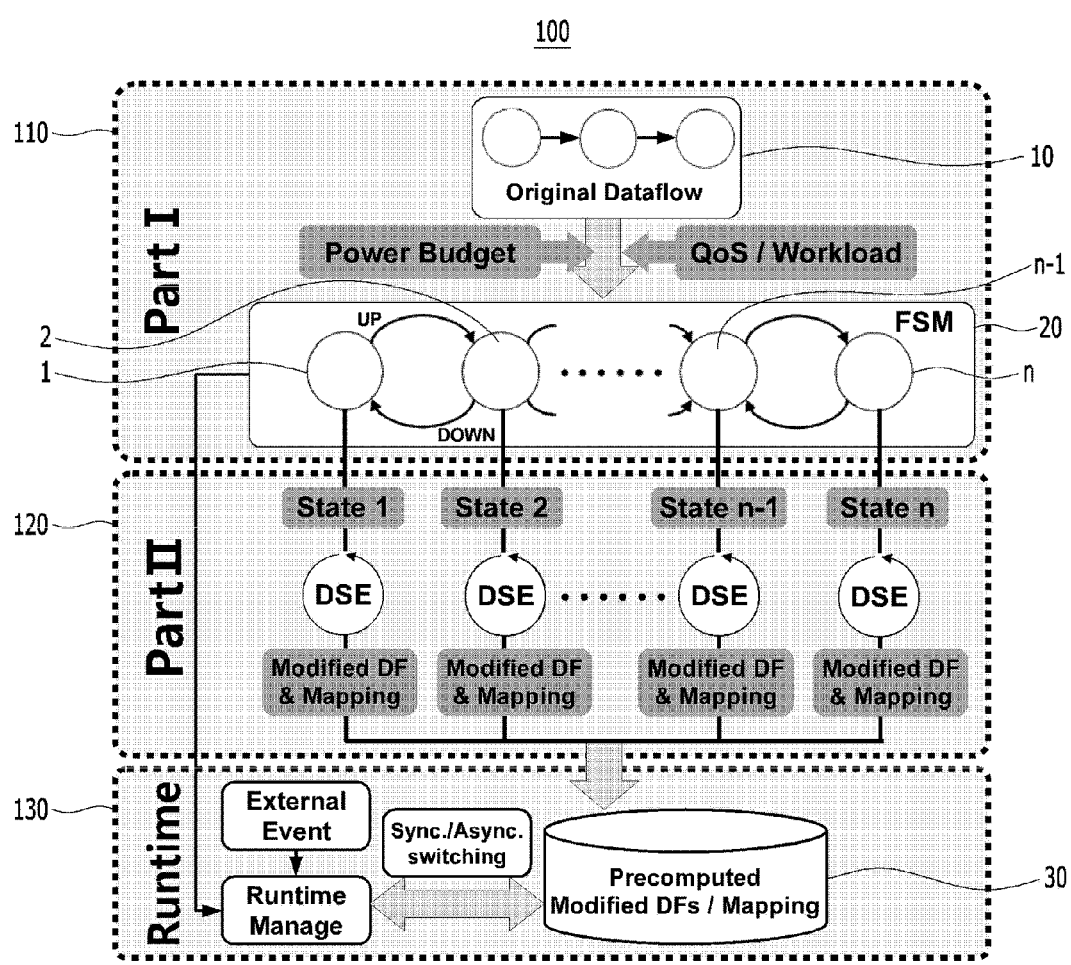
FIG. 2 is a diagram showing the entire flow in the dataflow optimization apparatus for low-power operation of a multicore system according to an embodiment of the present disclosure.

FIG. 1 is a block diagram showing a schematic configuration of a dataflow optimization apparatus 100 for low-power operation of a multicore system according to an embodiment of the present disclosure and FIG. 2 is a diagram showing the entire flow in the dataflow optimization apparatus 100 for low-power operation of a multicore system according to an embodiment of the present disclosure. The dataflow optimization apparatus 100 for low-power operation of a multicore system according to an embodiment of the present disclosure is referred to as the present apparatus 100 hereafter for the convenience of description.

Referring to FIGS. 1 and 2, the present apparatus 100 is related to a dataflow optimization apparatus for low-power operation of a multicore system (particularly, a multicore embedded system). The present apparatus 100 may also be referred to as a context-aware dataflow optimization apparatus enabling low-power operation of an image processing system (multicore embedded system) for an unmanned flying object to avoid obstacles. Further, the present apparatus 100 may also be referred to as context-aware dataflow adaptation apparatus for a low-power multicore embedded system.

Current embedded systems are operated in more and more dynamic environments. Computational workloads fluctuate or are adjustable. Further, since many apparatuses are driven by batteries, it is general to use a runtime power management technique, which has a problem of causing a dynamic power budget.

Accordingly, the present apparatus 100 presents a proposal about a design methodology for a multicore system based on dataflow specifications that can process various contexts (situations).

The present apparatus 100 may include a creating unit 110, an optimizing unit 120, and a control unit 130. The control unit 130 may also be referred to as a runtime management unit.

The present apparatus 100 can optimize original dataflow in consideration of various working conditions through the creating unit 110 and the optimizing unit 120, and then can autonomously adapt the original dataflow in a predetermined optimal type in correspondence to a state (context) change through the control unit 130. That is, when controlling an unmanned flying object (which may also be referred to as an unmanned air vehicle, a drone, etc.), the control unit 130 may control the unmanned air vehicle to freely adapt to various state changes in a predetermined optimal type.

The creating unit 110 may create an FSM 20 including a plurality of system states (1, 2, . . . , n−1, n) in consideration of dynamic factors that trigger a transition in system state (system context) for original dataflow 10 composed of a plurality of tasks. The FSM (Finite State Machine) 20 is a finite state machine and may mean a calculation model composed of finite states and transition among the states.

Further, the dynamic factors that trigger a transition in system state may be factors related to at least one of a QoS (Quality of Service) change (or a workload change) and a power budget change. That is, the creating unit 110 may create the FSM 20 including a plurality of system states (1, 2, . . . , n−1, n) in consideration of at least one of the QoS (or workload) change and the power budget change.

The optimizing unit 120 may optimize the original dataflow 10 by optimizing the FSM 20 created by the creating unit 110. The optimized original dataflow may be stored in a database 30.

The control unit 130 may provide a response to a change in system state on the basis of the original dataflow optimized by the optimizing unit 120 during runtime. In other words, when a system state is changed during runtime, the control unit 130 may control an unmanned flying object to autonomously adapt by extracting a response to the change from the database 30 in which an optimized original dataflow is stored, and providing the response to the unmanned flying object.

In other words, the process of creating an FSM by the creating unit 110 may also be referred to as a state derivation process in the present disclosure and the process of optimizing original dataflow by the optimizing unit 120 may also be referred to as an individual design space exploration (DSE) process. That is, the creating unit 110 may perform the state derivation process and the optimizing unit 120 may perform the individual design space exploration process.

In association with the state derivation process, the creating unit 110 may define a plurality of system states as some possible system states (system contexts), and the system states may be switched (transitioned) to each other during runtime.

In order to describe conditions causing a transition (switch) of the system states, the creating unit 110 may write (create) description of the FSM 20 for the original dataflow 10.

Thereafter, in association with the individual design space exploration process, the optimizing unit 120 may individually optimize the original dataflow 10 in consideration of predetermined conditions for the FSM 20 including a plurality of system states created in the state derivation process of the creating unit 110.

Since individual optimization is performed by the optimizing unit 120, a topology of the original dataflow 10 may be modified to be better matched with a corresponding system state (context).

The control unit 130, during runtime, may apply not only corresponding mapping, but a dataflow topology as responses to state transitions (a change in system state) according to state transitions of the created FSM 20.

In the present disclosure, a QoS (quality-of-service) change and various power budgets may be considered as dynamic factors that can trigger a transition in system state.

In association with a QoS that is one of the dynamic factors considered in the present disclosure, it is general to consider a multiple QoS level in an embedded computer vision region. Under specific conditions, a system may operate in a reduced QoS (e.g., a lower resolution) state, which provides better power efficiency. In relation to this, there are various algorithms combined with a QoS time tradeoff that is a so-called anytime algorithm.

Further, in association with various power budgets that are another one of the dynamic factors considered in the present disclosure may be one by a transition in external environment. Current, many embedded or cyber-physical systems have limited power due to mobility. Existing efforts for overcoming this problem, for example, existing efforts such as energy harvesting or runtime power management cause uncertainty.

There is, for example, [L. Schor, I. Bacivarov, D. Rai, H. Yang, S.-H. Kang, and L. Thiele. Scenario-based design flow for mapping streaming applications onto on-chip many-core systems. In Proceedings of the 2012 international conference on Compilers, architectures and synthesis for embedded systems, pages 71-80. ACM, 2012.] as one of technologies for processing runtime adaptive mapping of a dataflow-based multicore system.

This document, as described above, proposes a technology about a scenario-based multicore system design and optimization framework. In this document, respective execution modes have been designated in various states of an FSM (finite state machine). Further, other sets of dataflow applications are activated in the respective states in the document.

However, the work of the document is necessarily accompanied by a constraint that a designer has to explain all execution scenarios of a possible, so there is a problem that a solution cannot be expanded into fine-grained specifications. Accordingly, there is a defect that the performance improvement level of mapping optimization is insufficient.

However, in the present apparatus 100, the concept about a dynamic transition in system state has been generalized, unlike the related art including the document. In the related art including the document, it was assumed that transitions were usually caused by a change in execution mode or scenario, so different states (contexts) or modes are shown as a set of different active dataflow graphs. On the contrary, in the present apparatus 100, system states are considered as being able to transition even in single dataflow in accordance with a QoS change or a power budget change, as exemplified above.

Further, in the present apparatus 100, it is possible to modify a dataflow topology in order to better optimize the parallelism degree of applications not only by applying different mapping to different system states, but in a context-aware (state-aware) type.

The present apparatus 100 is described in more detail hereafter. Further, a method of actually implementing mode switching and influence on design matters such as latency (standby time, delay time) and power consumption in the present apparatus 100 are described in detail hereafter.

First, description of system models considered in the present apparatus 100 is as follows.

As system models, in the present apparatus 100, a dataflow application, multi-core architecture and mapping/scheduling, variable workloads, and parallelizable tasks may be considered.

Description about dataflow application is as follows.

An application is shown in a dataflow graph defined as a tuple <V, E>. V and E show respectively sets of vertices and directed edges. Each element v (v ∈ V) of V shows a task belonging to an application. Each task v is a priority that is a portion of description and it should be noted that v is associated with $pr_v$ that is a positive integer number.

Two tasks of the dataflow application may be in connection with each other by execution dependency. For example, when a task $v_2$ can be executed only after a task $v_1$ is finished, $v_2$ may be considered as being dependent to $v_1$, and this dependency may be explained as an edge going to a vertex $v_2$ from a vertex $v_1$ in a dataflow graph. In other words, the dependency may be described as a directed edge going to a vertex $v_2$ from a vertex $v_1$ in a dataflow graph. Dependency of $v_s$ to $v_d$ may be defined as a tuple $<v_s, v_d>$ and E may mean a set of all execution dependencies in a given dataflow.

Description about multi-core architecture and mapping/scheduling is as follows.

A multicore system may be expressed as a set of cores C and mapping decision may be provided as a function map of a functional function V→C. For example, when $map(v_i)=c_j$, a task $v_i$ may be performed at a core $c_j$. When two or more tasks can be executed at the same time at a core, the task having the lowest pr value may be selected for scheduling. In the present apparatus 100, it is assumed that self-timed scheduling is performed, another instance may be called right after finishing of an application instance.

Since most multicore processors are implemented by a CMOS technology, the power consumption of a core may be expressed as the sum of dynamic power consumption and static power consumption. The dynamic power consumption of a core c is defined as $p_c^{dyn}$, which may be counted only when a task is performed. On the other hand, the static power consumption of the core c is defined as $p_c^{stat}$, which may be counted even in an idle state in which the core does not perform any task.

In the present apparatus 100, dynamic power management is not clearly applied, but a designer may be allowed to always select turn off for some cores. In this case, the power consumption of the core c may be expressed as $p_c^{idle}$.

Description About Variable Workloads is as Follows.

As described above, an application may operate at various different QoS levels. In the present apparatus 100, a positive integer number $l \in [l^{min}, l^{max}]$ is introduced to model influence of a QoS level on system operation, in which the larger the positive integer number, the higher the QoS level. In this case, it should be noted that the execution time of a task is a monotonously increasing function of QoS level l.

That is, the execution time of a task v at a core c is defined as $exec_{v,c}(l)$, which may satisfy $exec_{v,c}(l^{min}) \leq exec_{v,c}(l) \leq exec_{v,c}(l^{max})$.

Description About Parallelizable Tasks is as Follows.

It may be assumed that vertices of some dataflow may be executed at the same time at a multi-process element in the present apparatus 100. These may be considered as a plurality of independent data sets, which is matched with a state-of-the-art parallel program programming model such as an OpenCL or a CUDA. In the present apparatus 100, this parallelization technology is made possible in a dataflow specification by modifying a dataflow topology.

In the present apparatus 100, a task v of original dataflow is in association with an mpd(v) that is the maximum parallelism degree. That is, when mpd(v)=n, the task v may be executed at the same time at maximally n cores. In the present apparatus 100, the parallelism degree of each task may be optimized and a dataflow topology may be correctly modified at design time. For example, it is assumed that original dataflow 10 is given as $V=\{v_a, v_b, v_c\}$, $E=\{\langle v_a, v_b \rangle, \langle v_b, v_c \rangle\}$ and $v_b$ has been parallelized two times.

In this case, the modified dataflow (that is, the optimized dataflow) may be expressed as $$V'=\{v_a, v_{b1}, v_{b2}, v_c\}, E'=\{\langle v_a, v_{b1} \rangle, \langle v_a, v_{b2} \rangle, \langle v_{b1}, v_c \rangle, \langle v_{b2}, v_c \rangle\}.$$

Further, in the present apparatus 100, it is possible to formulate two optimization problems using the system model described above. In the two optimization problems, QCPM (QoS-Controlled-Power-Minimization) may be considered as a first optimization problem and PCQM (Power-Constrained-QoS-Maximization) may be considered as a second optimization problem.

The two optimization problems considered in the present apparatus 100 may be dataflow <V', E'> and a mapping decision map in both of which <V, E>, C, and exec are given as input and expected output is modified. Further, in the present apparatus 100, as a time constraint, end-to-end latency of a schedule related to a map may be set to be always smaller than or equal to predetermined time T.

The QCPM that is the first optimization problem may mean QoS-Controlled-Power-Minimization. In the first optimization problem (QCPM optimization problem), a set of QoS levels L is given and it is assumed that a QoS requirement of a system may be changed during runtime within L. In the first optimization problem, the time constraint (that is, predetermined time) should be satisfied in any case and it may be the optimization purpose to minimize power consumption.

The PCQM that is the second optimization problem may mean Power-Constrained-QoS-Maximization. In the second optimization problem (PCQM optimization problem), it is not a purpose, but a constraint to minimize power consumption. That is, in the second optimization problem, power consumption of a system for specific time may be set to be smaller than or equal to a power constraint (PC). In association with the second optimization problem, it is possible to dynamically change the PC when devising an optimization technique that can adapt to runtime in the present apparatus 100. That is, in the second optimization problem, it may be the optimization target to maximally set a QoS level in connection with a power budget.

The present apparatus 100 may be largely composed of two kinds of design time optimization parts (i.e., part 1 and part 2) by the creating unit 100 and the optimizing unit 120, and a runtime management part by the control unit 130. In this configuration, one of the two design time optimization parts is the part 1 and may mean a state derivation process that is the FSM creation process by the creating unit 110. Further, the other one of the two design time optimization parts is the part 2 and may mean an individual design space exploration process that is the optimization process of original dataflow by the optimizing unit 120.

Description about the state derivation process by the creating unit 110 is as follows.

The creating unit 110 can create an FSM 20 including a plurality of system states (1, 2, ..., n−1, n) in consideration of dynamic factors that trigger a transition in system state (in other words, conditions causing a transition in system state) for original dataflow 10 composed of a plurality of tasks. The dynamic factors that trigger a transition in system state may include a factor about at least one of a QoS change and a power budget change. That is, the creating unit 110 may create the FSM 20 including a plurality of system states in consideration of the dynamic factors.

Tasks included in the original dataflow 10 may mean, for example, when an obstacle shows up, when it is morning, when it is night, and when a battery level is a predetermined value or less, etc., while flight of an unmanned flying object is controlled.

Further, the system state may mean, in association with a QoS level, a state when the QoS level is a first QoS level and a state when the QoS level is a second QoS level while flight of an unmanned flying object is controlled. The state with the first QoS level $l_1$ may mean a state (system state) having relatively lower resolution than that of the state with the second QoS level $l_2$. As another example, the system state may mean, in association with a power budget, a state when the power budget level is a first power budget level and a state when the power budget level is a second power budget level, for example, while flight of an unmanned flying object is controlled. The state with the first power budget level may mean a state (system state) with relatively low power consumption in comparison to the state with the second power budget level.

Accordingly, the creating unit 110 may model task states fitting various multiple tasks and necessary requirements (e.g., resolution, QoS, power, and time). That is, the creating unit 110 may model task states fitting requirements (e.g., resolution, QoS, power, and time) for dynamic factors as the FSM 20 including a plurality of system states in consideration of various tasks included in the original dataflow 10 and the dynamic factors that trigger a transition in system state.

In other words, the creating unit 110 may model task states (i.e., a plurality of system state) respectively fitting requirements (in accordance with requirement) for various tasks and various dynamic factors. As the result of modeling by the creating unit 110, the FSM 20 including a plurality of system states (1, 2, ..., n−1, n) may be created by the creating unit 110.

In detail, the creating unit 110 may define possible system states (possible system contexts) about given problems to enable efficient runtime adaptation. That is, the creating unit 110 may define task states respectively fitting requirements for various tasks and various dynamic factors as system states. Accordingly, a plurality of system states (1, 2, ..., n−1, n) may be defined by the creating unit 110.

When a system state (a plurality of system states) is defined, the creating unit 110 may create (induce) an FSM 20 that is a state showing a defined system state in accordance with the approach method proposed in [L. Schor, I. Bacivarov, D. Rai, H. Yang, S.-H. Kang, and L. Thiele. Scenario-based design flow for mapping streaming applications onto on-chip many-core systems. In Proceedings of the 2012 international conference on Compilers, architectures and synthesis for embedded systems, pages 71-80. ACM, 2012.].

In this case, the creating unit 110 may create system states included in the FSM 20 as many as the number of QoS levels if the type of an optimization problem is QCPM (QoS-Controlled-Power-Minimization), and may create system states included in the FSM 20 as many as the number of power budget levels if the type of an optimization problem is PCQM (Power-Constrained-QoS-Maximization).

In detail, when it is QCPM, the system states included in the FSM 20 may be defined as a set of possible QoS levels L. Accordingly, when it is QCPM, the creating unit 110 may create an FSM 20 including system states as many as $|L|$. That is, when the type of an optimization problem is QCPM, the creating unit 110 may create system states as many as the number of QoS levels and may create an FSM 20 including a plurality of system states created as many as the number of the QoS levels (the number of L).

In this case, tasks may be associated with different execution time for different system states. That is, a task v at a core c has execution time of $exec_{v,c}(l_1)$ in a system state in which the QoS level is $l_1$, but may have execution time of $exec_{v,c}(l_2)$ in another system state in which the QoS level is $l_2$.

Meanwhile, the creating unit 110 may create the system states included in the FSM 20 as many as the number of power budget levels if the type of an optimization problem is PCQM. In this case, different power constraints (PC) may be applied to each of the power budget levels.

That is, the system states included in the FSM 20 created by the creating unit 110 may be created as many as the number of the QoS levels that can be considered in the present apparatus 100 when it is QCPM, and may be created as many as the number of power budget levels that can be considered in the present apparatus 100 when it is PCQM.

Further, assuming that a plurality of system states included in the FSM 20 is sequentially arranged in accordance with the QoS levels and/or power budget levels (i.e., in accordance with the levels of QoS levels and/or the levels of power budget levels), the creating unit 110 may create an FSM such that state transitions are possible between adjacent system states.

In detail, the creating unit 110 may give a limitation in FSM transition for analysis possibility and easiness of optimization. In this case, the limitation in FSM transition may mean a condition that allows for state transitions only between adjacent system states of a plurality of system states included in the FSM 20. Accordingly, the creating unit 110 may create an FSM 20 including a plurality of system states that allows for state transitions (system state transitions) only between adjacent system states.

For example, when it is $l_1 < l_2 < l_3$ in a QCPM optimization problem, a direct transition between $l_1$ and $l_3$ may not be allowed. That is, in the QCPM optimization problem, a direct state transition (system state transition) may not be allowed between the system state with a QoS level of $l_1$ and the system state with a QoS level of $l_3$. In other words, when the optimization problem considered in the present apparatus 100 is QCPM, the creating unit 110 may create an FSM 20 such that the transition from the system state with a QoS level of $l_1$ to the system state with a QoS level of $l_3$ is possible, but the transition from the system state with a QoS level of $l_1$ to the system state with a QoS level of $l_6$ is impossible. In this case, the transition from a lower level (lower QoS level) to a higher level (higher QoS level) may be called an up transition and the transition from a higher level (higher QoS level) to a lower level (lower QoS level) may be called a down transition.

Similarly, as for PCQM, a transition to a higher power budget level may be called an up transition and a transition to a lower power budget level may be called a down transition.

Next, description about the individual design space exploration process by the optimizing unit 120 is as follows.

The optimizing unit 120 may optimize the original dataflow 10 by optimizing the FSM 20 created by the creating unit 110.

The optimizing unit 120 may map each of a plurality of tasks corresponding to the FSM 20 created by the creating unit 110 to at least one core of multiple cores and may schedule the tasks mapped to the multiple cores to satisfy predetermined conditions. In particular, the optimizing unit 120 may schedule the tasks mapped to the multiple cores to satisfy predetermined conditions by performing priority-based list-scheduling on the tasks mapped to the multiple cores. The tasks mapped and scheduled to the multiple cores, which are tasks scheduled to satisfy the predetermined conditions, may mean individually optimized original dataflow (i.e., modified original dataflow). In other words, mapping and original dataflow may be optimized by the optimizing unit 120.

The predetermined conditions may mean conditions that minimize power consumption when the type of an optimization problem considered in the present apparatus 100 is QCPM and may mean conditions that maximize a QoS level in association with a power budget when the type of an optimization problem considered in the present apparatus 100 is PCQM. Further, the predetermined conditions may further include a condition that sets latency (i.e., the time difference between start of the first task and completion of the last task) to be predetermined time or less when the tasks scheduled through the multiple cores are parallelized. More detailed description is as follows.

As shown in FIG. 2, the states (system states) of an FSM 20 created by the creating unit 110 may have different constraints or design parameters, so they may be individually optimized by the optimizing unit 120.

Here, the multicore mapping of a dataflow application is a well-known NP-hard problem, so, in the present apparatus 100, for example, a DSE engine was constructed on the basis of a genetic algorithm (GA) in Opt4J that is a meta-heuristic solver framework that can be used in public. That is, it is possible to use Opt4J that is a meta-heuristic solver framework that can be used in public as an optimizing engine, for example, in the present apparatus 100.

Figure 3:
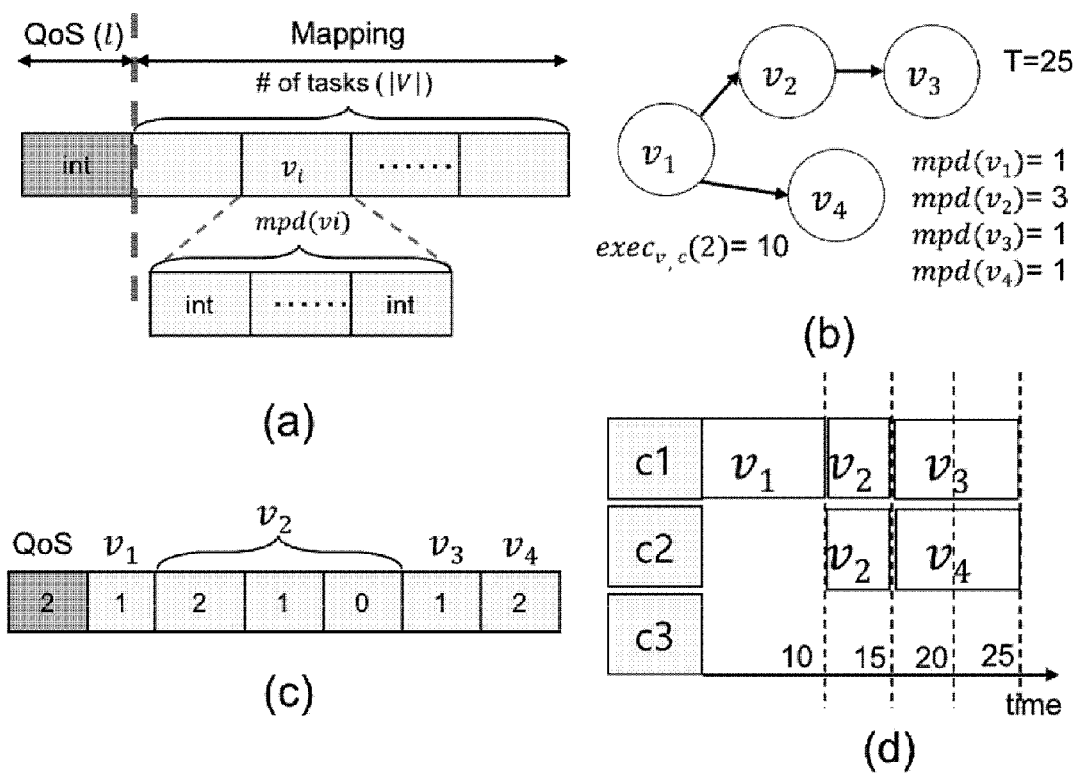
FIGS. 3 and 4 are diagrams illustrating a design space exploration process by an optimizing unit in the dataflow optimization apparatus for low-power operation of a multicore system according to an embodiment of the present disclosure.
Figure 4:
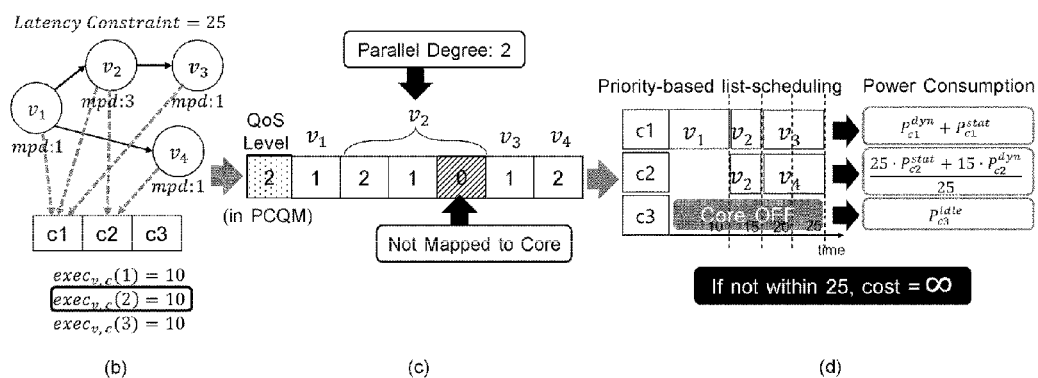

FIGS. 3 and 4 are diagrams illustrating a design space exploration (DSE) process by an optimizing unit 120 in the dataflow optimization apparatus 100 for low-power operation of a multicore system according to an embodiment of the present disclosure.

In FIGS. 3 and 4, (a) of FIG. 3 is a diagram showing an optimization example of an FSM by the optimizing unit 120 of the present apparatus 100. In particular, (a) of FIG. 3 shows an example of a genotype structure devised to solve a QCPM problem and a PCQM problem in the present apparatus 100. (b) of FIG. 3 shows an example of original dataflow 10 considered in the present apparatus 100. (c) of FIG. 3 shows an example of a possible mapping solution in the present apparatus 100, for example, as an encoding result by a genetic algorithm. (d) of FIG. 3 shows an example of the result of applying priority-based list-scheduling to tasks mapped to multiple cores.

Referring to (a) of FIG. 3, the genotype structure devised in the present apparatus 100 may be composed of a QoS part and a mapping part.

In this case, as for the QoS part, the QoS is already fixed in the states (system states) of QCPM, so it may be effective only for PCQM. Accordingly, the optimizing unit 120 may select a single positive integer value that is $l \in [l^{min}, l^{max}]$ as a QoS level in the system states of PCQM.

In the mapping part, modification of original dataflow and mapping may be optimized at the same time.

Each task v ($v \in V$) may be designated with slots as many as mpd (v). In other words, the optimizing unit 120 may designate slots as many as an mpd (V) to each of a plurality of task when mapping each of a plurality of tasks corresponding to an FSM 20 created by the optimizing unit 120 to at least one core of multiple cores.

A positive integer value may be designated to each of the slots during the design space exploration (DSE) process. The positive integer value that is designated to each of the slots shows an identifier (ID) of the core to which a corresponding task is mapped of multiple cores. When a positive integer value designated to a slot is 0, which may mean that is not effective mapping.

An example based on the original dataflow 10 shown in (b) of FIG. 3 is as follows.

Referring to (b) of FIG. 3, $v_1$, $v_2$, $v_3$, and $v_4$ each may mean a plurality of tasks included in the original dataflow 10. The mpd (v) shows the maximum parallelism degree of a task v. That is, mpd ($v_1$)=1 means that the maximum parallelism degree $v_1$ that is the first task of a plurality of tasks is 1, which may mean that $v_1$ that is the first task can be executed at maximum one core. That is, mpd ($v_2$)=3 means that the maximum parallelism degree $v_2$ that is the second task of a plurality of tasks is 3, which may mean that $v_2$ that is the second task can be executed at maximum three cores at the same time. In the example shown (b) of FIG. 3, the task $v_2$ may be a task that is the only one task having the maximum parallelism degree (mpd) larger than 1 of a plurality of tasks.

Further, in an embodiment of the present disclosure, the execution time of tasks at cores c1, c2, and c3 of multiple cores may be set as 10 for QoS levels. That is, $exec_{v,c}(2)=10$ may mean the execution time of a task v at a core c is 10, for example, when the QoS level l is 2.

Referring to (c) of FIG. 3, since the maximum parallelism degree of the task $v_2$ is 3, when the task $v_2$ is designated to at least one core of multiple cores, three integer values may be designated such that the task $v_2$ is mapped to three slots of the slots of the multiple cores. The integer values in the three slots designated to the task $v_2$ are 2, 1, and 0, so the task $v_2$ may be mapped to c2 that is the second core and c1 that is the first core of the multiple cores. That is, since 2 was designated to the task $v_2$ as a positive integer value, the task $v_2$ may be mapped to c2 that is the second core. Further, since 1 was designated to the task $v_2$ as a positive integer value, the task $v_2$ may be mapped also to c1 that is the first core. Further, when 0 has been designated to the task $v_2$ as a positive integer value, the task $v_2$ may not be mapped to a core (not mapped to core). As a result, the task $v_2$ may be parallelized (parallel degree 2) at two instances by being mapped to c1 that is the first core and c2 that is the second core of the multiple cores.

As in (c) of FIG. 3, each of populations created by a GA engine may mean a possible mapping candidate. In other words, the information that the optimizing unit 120 maps each of tasks to at least one core of multiple cores, as in (c)

of FIG. 3, may mean not decided mapping information, but candidate mapping information.

That is, the optimizing unit 120 may decide candidate mapping information by mapping each of a plurality of tasks corresponding to the created FSM 20 to at least one core of multiple cores. Thereafter, the optimizing unit 120 may determine whether predetermined conditions are satisfied by applying priority-based list-scheduling to the tasks mapped to the multiple cores and may decide mapping information of the tasks mapped to the multiple cores when the predetermined conditions are satisfied as the result of determination. In other words, the optimizing unit 120 may determine candidate mapping information and then determine (estimate) whether the determined candidate mapping information satisfies predetermined conditions and may decide the candidate mapping information as final mapping information when the predetermined conditions are satisfied as the result of determination (estimation).

The optimizing unit 120 may schedule the tasks mapped to the multiple cores such that the tasks satisfy predetermined conditions by applying priority-based list-scheduling to the tasks mapped to the multiple cores. The predetermined conditions, as described above, may mean conditions that minimize power consumption if the type of an optimization problem is QCPM and may mean conditions that maximize a QoS level in association with a power budget if the type of an optimization problem is PCQM. Further, the predetermined conditions may further include a condition that sets latency to be predetermined time or less in parallelizing the tasks scheduled through the multiple cores. The predetermined time, for example, may be set as 25 ms. In other words, a latency constraint, for example, may be set as 25 ms in the present apparatus 100. The unit of time of the latency constraint is exemplified as ms, but it is not limited thereto and various units of time may be applied.

In detail, in the present apparatus 100, if the type of an optimization problem is QCPM, it may be a purpose (target) to minimize power consumption. Accordingly, the optimizing unit 120 may perform scheduling on fixed mapping information (i.e., candidate mapping information) encoded to a gene by applying priority-based list-scheduling.

The scheduling result on the mapping solution of (c) of FIG. 3 is shown as an example in (d) of FIG. 3. It may be assumed that workloads (i.e., execution time) of all tasks are 10 when the QoS level is 2 for brief description in an embodiment of the present disclosure. That is, $exec_{v,c}(2)=10$ may be assumed.

Referring to (d) of FIG. 3, as described above, since the integer values in the three slots designated to the task $v_2$ are 2, 1, and 0, the parallelism degree of the task $v_2$ is 2, so the workload of the task $v_2$ may be reduced as much as the parallelism degree. Accordingly, when the task $v_2$ is mapped in parallel to c1 that is the first core and c2 that is the second core, respectively, it may be mapped to have a half workload, as compared with the workloads of all tasks initially set as 10 (i.e., the execution time of all tasks were set as 10). That is, the workloads (execution time) of the task $v_2$ mapped to c1 and c2 may be 5 (10/2=5).

In other words, the task $v_2$ is performed (processed) in parallel for execution time corresponding to 5 at each of c1 and c2, it may be performed for execution time corresponding to a total of 10 through c1 and c2. In the task $v_4$, the integer value in one slot designated to the task $v_4$ is 2, so the task $v_4$ may be performed for execution time corresponding to 10 at c2.

Further, $pr_{v2} > pr_{v4}$ in accordance with predetermined priority, so the task $v_2$ may be scheduled to be processed prior to the task $v_4$ at c2.

As described above, when priority-based list-scheduling of tasks mapped to multiple cores is finished, the optimizing unit 120 may calculate average power consumption for each of the multiple cores. The average power consumption may be calculated using $p_c^{dyn}$ that is dynamic power consumption, $p_c^{stat}$ that is static power consumption, and $p_c^{idle}$ that is power consumption in an idle state in which any operation is not performed.

In (d) of FIG. 3, c1 that is the first core continuously has tasks, so the power consumption may be calculated as $p_{c1}^{dyn} + p_{c1}^{stat}$. However, c3 that is the third core has no scheduled task, the power consumption may be calculated as $p_c^{idle}$ corresponding to the idle state. That is, since c3 was not used in scheduling, it may be turned off due to the power consumption of $p_c^{idle}$. In other words, c3 may be off (core off).

Considering the scheduled tasks, the power consumption of c2 that is the second core may be calculated as $$\frac{25 \cdot P_{c2}^{stat} + 15 \cdot P_{c2}^{dyn}}{25}.$$

On the other hand, in the present apparatus 100, when the type of an optimization problem is PCQM, it may be a purpose (target) to maximally set a single integer value l encoded at the QoS part.

Other than this purpose, the optimizing unit 120 may determine (estimate) whether latency constraint is satisfied when deciding candidate mapping information. The latency may mean the time difference from the point in time when the first task is started to the point in time when the last task is finished, that is, between the start of the first task and the finishing of the last task.

The optimizing unit 120 may perform scheduling such that latency is always smaller than or equal to predetermined time T in all of two optimization problems (i.e., QCPM and PCQM) considered in the present apparatus 100. In other words, in the decided mapping information, latency for tasks mapped and scheduled to multiple cores may satisfy time that is the predetermined time T or less.

The latency for the scheduled tasks in the embodiment of (d) of FIG. 3 is the same as the value of a predetermined latency constraint T=25, so the scheduling in (d) of FIG. 3 may be considered as effective scheduling.

In this case, when the latency for the scheduled task to a mapping solution does not satisfy conditions of a predetermined latency constraint, for example, the optimizing unit 120 may give penalties of ∞ and −∞ in QCPM and PCQM, respectively. Further, a power constraint may be forced in PCQM. That is, when the average power consumption of a mapping solution is larger than a power constraint (PC) in PCQM, the optimizing unit 120 may set a target value as −∞, but which may be construed as one of the worst solutions. Accordingly, the optimizing unit 120 may perform scheduling on the tasks mapped to multiple cores such that predetermined conditions are satisfied (that is, power consumption is minimized in QCPM, a QoS level is maximized in PCQM, and latency satisfies the predetermined time T or less in both of the two optimization problems).

By mapping and scheduling by the optimizing unit 120, original dataflow may be optimized. That is, modifying and mapping of original dataflow is optimized at the same time through optimization of the FSM 20 by the optimizing unit 120, optimized original dataflow may be created.

The optimizing unit 120 may optimize the original dataflow 10 by optimizing the FSM 20 created by the creating unit 110. The optimized original dataflow may be stored in a database 30.

The control unit 120 may perform runtime manage. The control unit 130 may provide a response to a change in system state on the basis of the original dataflow optimized by the optimizing unit 120 in runtime. In other words, when a system state is changed during runtime, the control unit 130 may control an unmanned flying object to autonomically adapt by extracting a response to the change from the database 30 in which an optimized original dataflow is stored, and providing the response to the unmanned flying object.

In detail, two design time optimization parts (i.e., part 1 and part 2) are performed by the creating unit 110 and the optimizing unit 120, the present apparatus 100 may obtain a modified DF & mapping solution of the FSM and the optimum original dataflow for all states of the FSM 20 (i.e., for the plurality of system states included in the FSM 20). In this case, the modified DF & mapping solution information of the optimized original dataflow obtained for all the system states in the FSM 20 may be stored in the database 30 as information on the optimized original dataflow.

In the present apparatus 100, state transitions (transitions in system state) may be triggered by an external event (e.g., PCQM) or an internal requirement of an application (e.g., QCPM). Implementation of event handling is not described in detail in the present disclosure, for example, due to space limitation.

In the present disclosure, in association with event handling, for example, a hierarchical controller and an event management technique proposed in [L. Schor, I. Bacivarov, D. Rai, H. Yang, S.-H. Kang, and L. Thiele. Scenario-based design flow for mapping streaming applications onto on-chip many-core systems. In Proceedings of the 2012 international conference on Compilers, architectures and synthesis for embedded systems, pages 71-80. ACM, 2012.] may be applied.

Some state transitions (some transitions in system state) may change a topology and mapping of original dataflow required by runtime task migrations. The overhead of active tasks migrating from one core to another core has been known as not being ignorable for homogeneous ISA multiple cores. In order to prevent this side effect, all tasks for all states (i.e., a plurality of system states) included in the FSM 20 may be instantiated in the present apparatus 100.

In this case, fundamentally, instantiated tasks may be blocked to a start event and paused, and a set of appropriate tasks may be selected, unblocked, and resumed in accordance with a state transition. In pause/resume mode switching, task migration is more efficient, but additional time or energy overhead may occur.

In order to solve this problem, the present apparatus 100 may provide two types of mode switching that include a synchronous type and an asynchronous type for the technology proposed in the present disclosure to further optimize original dataflow.

That is, the control unit 130 may perform synchronous/asynchronous switching between databases 30 storing optimized original dataflow in runtime management. In the present apparatus 100, for example, it may be implemented using POSIX API for a multicore runtime manager that can be used in public as a synchronization scheme.

The control unit 130 may resume a set of new tasks (new tasks) after the current tasks are successfully paused in synchronous switching. On the contrary, the control unit 130 may allow new tasks to be activated when previous tasks are still being executed in asynchronous switching. Accordingly, tradeoff may occur between efficiency of transitions and general energy consumption.

Accordingly, the present apparatus 100 may put the optimized original dataflow in the database 30 in consideration of various working conditions. Thereafter, when a system state is changed during runtime, the control unit 130 may provide optimized information for the changed system state as a response to the change of the system state on the basis of the database 30. In this case, the control unit 130 may provide the response to the change in system state to an unmanned flying object. Accordingly, the unmanned flying object may be autonomically controlled in an optimized system state corresponding to optimized information in accordance with the response provided by the control unit 130 of the present apparatus 100.

Figure 5:
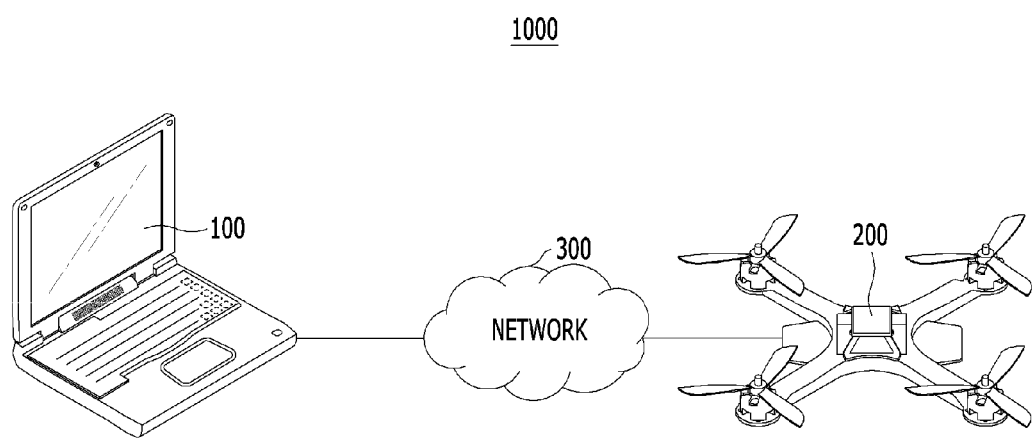
FIG. 5 is a diagram showing a schematic configuration of a system for low-power operation of a multicore system according to an embodiment of the present disclosure.

FIG. 5 is a diagram showing a schematic configuration of a system 1000 for low-power operation of a multicore system according to an embodiment of the present disclosure.

Referring to FIG. 5, the system 1000 (hereafter, referred to as 'the present system' for the convenience of description) for low-power operation of a multicore system according to an embodiment of the present disclosure may include the dataflow optimization apparatus 100 (present apparatus) for low-power operation of a multicore system and an unmanned flying object 200. In the description of the present system 1000 referring to FIG. 5, the above description about the present apparatus 100 and the unmanned flying object 200, even if it was omitted, may be equally applied to the description about the present system 1000.

The present apparatus 100 and the unmanned flying object 200 are separately shown in FIG. 5, but the present disclosure is not limited thereto and the present apparatus 100 may be disposed to be embedded in the unmanned flying object 200, as another example.

Data transmission/reception may be performed between the present apparatus 100 and the unmanned flying object 200 through a network 300.

The network 300, for example, may include a 3GPP (3rd Generation Partnership Project) network, an LTE (Long Term Evolution) network, a WiMAX (World Interoperability for Microwave Access) network, the internet, a LAN (Local Area Network), a Wireless LAN (Wireless Local Area Network), a WAN (Wide Area Network), a PAN (Personal Area Network), a Bluetooth network, an NFC (Near Field Communication) network, a satellite broadcasting network, an analogue broadcasting network, a DMB (Digital Multimedia Broadcasting) network, etc., but is not limited thereto.

For example, information about a change in system state, information about a change in task, etc. which is information that is transmitted to the present apparatus 100 may be included in the data transmitted/received between the present apparatus 100 and the unmanned flying object 200 through the network 300. Further, for example, information about a response to a change in system state, etc. that is information that is transmitted from the present apparatus 100 to the unmanned flying object 200 may be included in the data transmitted/received between the present apparatus 100 and the unmanned flying object 200.

For example, the flight of the unmanned flying object 200 may be controlled in a system state having first resolution with a QoS level of 1 ($l_1$) by the control unit 130 of the present apparatus 100. When an obstacle shows up while the flight of the unmanned flying object 200 is controlled, the unmanned flying object 200 may provide information about a task saying that an obstacle has shown up to the present apparatus 100.

When the present apparatus 100 obtains the information about a task saying that an obstacle has shown up from the unmanned flying object 200, the present apparatus 100 may provide information about a system state corresponding to the task (the task saying that an obstacle has shown up) of a plurality of system states modeled in advance, as a response to the obtained information. The response that is provided to the unmanned flying object 200 from the present apparatus 100, that is, the information about a system state corresponding to the task (the task saying that an obstacle has shown up), for example, may mean information for controlling the flight of the unmanned flying object 200 in a system state having second resolution of a QoS level of 2 ($l_2$). Further, the system state of a QoS level of 2 may mean a state (system state) having relatively high resolution in comparison to the system state of a QoS level of 1.

That is, the present apparatus 100 may enable a more precise image to be obtained through the unmanned flying object 200 (that is, an image having higher resolution than the resolution of the current obtained image to be obtained) by controlling the unmanned flying object 200 such that the QoS level is changed from 1 to 2 when an obstacle shows up while the unmanned flying object 200 is in flight.

Accordingly, the present system 1000 relates to an image processing system that enables low-power operation for the unmanned flying object 200 to avoid an obstacle.

The present system 1000 may model task states fitting various tasks and necessary requirements (resolution, QoS, power, time, etc.) in advance through the present apparatus 100. Further, the present system 1000 may designate (map) one or more cores that perform corresponding tasks in accordance with tasks and conditions, which are input in real time through the unmanned flying object 200, through the present apparatus 100.

On the basis of this work, the present system 1000 may provide optimized tasks such that the optimized tasks are performed in response to the tasks and conditions that are input in real time through the unmanned flying object 200. That is, the present system 1000 may provide an image processing system such that necessary tasks are efficiently performed under given power conditions and time conditions in response to the tasks and conditions that are input in real time through the unmanned flying object 200.

The unmanned flying object 200 was controlled only at a single QoS level in the related art. However, in the present system 1000, it is possible to model in advance a plurality of system states according to dynamic factors (i.e., a QoS change or a power budget change) that trigger a transition in system state, and then flexibly change the system states in accordance with various tasks and requirements such that the unmanned flying object 200 can operate in system states optimized for required conditions in corresponding tasks when a task saying as if an obstacle showed up is input (that is, an event occurs). In other words, in the present system 1000, it is possible to flexibly change the QoS level (e.g., resolution) or the power budget level to fit various tasks and requirements. Accordingly, the unmanned flying object 200 may be autonomically adapted and controlled in system states optimized for tasks and conditions that are input in real time.

An example in which computer vision has been applied to an unmanned flying object that is an actual application as a case study to examine the possibility of actual application of the technology proposed in the present apparatus 100 (i.e., a dataflow optimization technology for low-power operation of a multicore system).

For example, high-end drones are equipped with radar sensors for sensing and avoiding obstacles in flight, but it may be inefficient to use expensive hardware modules for low-end drones.

It may be one of solutions that can be implemented for low-end drones to obtain a 2D scene from a camera and detect obstacles in the obtained scene through computer vision processing that requires considerable computing capability.

This operation is performed in real time with intensive battery power and calculation, so it may be considered as a benchmark suitable for the present disclosure.

Description About a Hardware Platform is as Follows.

Figure 6:
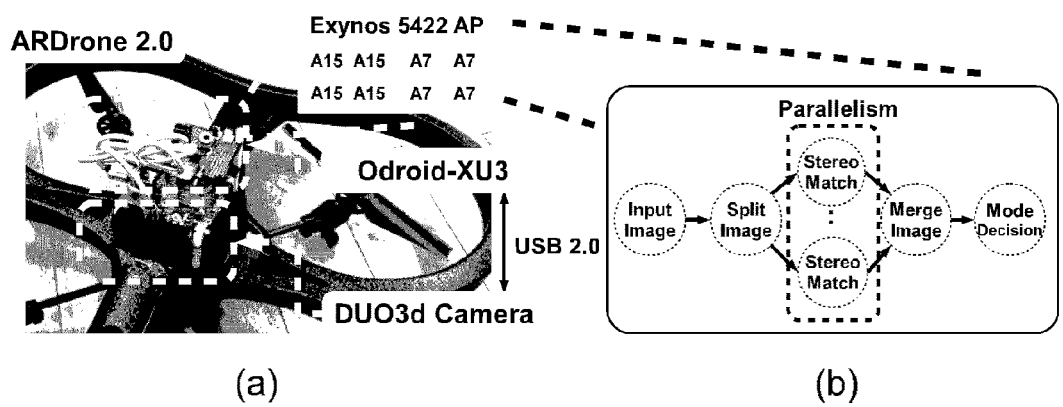
FIG. 6 is a diagram showing an example of a hardware configuration for an unmanned flying object to which the dataflow optimization apparatus for low-power operation of a multicore system according to an embodiment of the present disclosure is applied.

FIG. 6 is a diagram showing an example of a hardware configuration for an unmanned flying object to which the dataflow optimization apparatus 100 for low-power operation of a multicore system according to an embodiment of the present disclosure is applied. In particular, (a) of FIG. 6 shows a hardware configuration of a target platform (e.g., an unmanned flying object) to which the present apparatus 100 is applied and (b) of FIG. 6 shows dataflow specifications of a stereo-vision block matching algorithm.

Referring to (a) of FIG. 6, in an experimental example of the present disclosure, for example, Odroid-XU3 that is a multicore embedded board such as ARDrone 2.0 connected to a stereo-vision camera through USB 2.0 may be mounted on an unmanned flying object that is a COTS (Commercial Off-The-Shelf) in order to process in real time scenes (2D scenes) input through the unmanned flying object.

For example, quad Cortex-A15 that is a foreign octa-core (e.g., big.LITTLE architecture) (which is large and has high performance, but consumes power) and quad ortex-A7 (which is small and slow, but has efficient power consumption) may be mounted on the embedded board.

In an experimental example of the present disclosure, INA231 that is an on-chip current sensor integrated with a target board may be used to induce and calibrate power models $p_c^{dyn}$, $p_c^{stat}$, $p_c^{idle}$.

Detailed Description About Stereo-Vision and Dataflow Modeling is Described as Follows.

A stereo-vision algorithm may be employed to detect obstacles in an experimental example of the present disclosure.

Accordingly, in the present apparatus 100, it is possible to obtain scenes from two cameras horizontally disposed with a predetermined gap on an unmanned flying object, like the eyes of a human, and extract a depth map by comparing the two scenes obtained from the two cameras. To this end, the present apparatus 100, for example, may include a depth map extractor (not shown).

Further, in an experimental example of the present disclosure, for example, a block matching (BM) algorithm of a plurality of stereo-vision algorithms that can be used in public was selected and implemented and depth values of pixels may be estimated by comparing SAD (Sum of Absolute Difference) values of surrounding blocks.

(b) of FIG. 6 shows how block matching (BM) is designated in dataflow.

Referring to (b) of FIG. 6, two input images may be obtained in task on the original and may be obtained as split images by being appropriately segmented in a successive task. Thereafter, the segmented images (i.e., split images) may be processed by the most computationally intensive main task (i.e., stereo match). Further, in an experimental example of the present disclosure, a block matching procedure is performed completely independently for each pixel, so a large quantity of parallelism may be performed in the stereo match task. That is, in a model proposed in the present disclosure, the mpd that is the parallelism degree of this task (stereo match), for example, may be set to be greater than 1.

Parallelized stereo matching is converged in a merge image, and then the depth map may be obtained in the final task, that is, a mode decision process.

The pixels of the depth map may have integer values between 0 and 255, which shows the relative distance of a subject closest to 255.

In an experimental example of the present disclosure, mode decision may be allowed in QCPM to change a QoS level, as will be described below.

At least a 4 FPS (First-person shooter), that is, a latency constraint T of 250 ms may be required for operation of the stereo-vision application considered in an experimental example of the present disclosure.

An experimental example of the present disclosure is described in more detail hereafter.

Experimental setup in an experimental example of the present disclosure may be as follows. In relation to this, the effects of the technology proposed by the present disclosure are quantitatively estimated hereafter by applying a QCPM problem and a PCQM problem to not only the case study described above, but synthetic dataflow.

In an experimental example of the present disclosure, three synthetic dataflow graphs respectively composed of ten, fifty, and a hundred tasks were created using SDF3. Further, in an experimental example of the present disclosure, tasks having high execution time of upper 30% were selected and their mpd were set as 8 that is the number of cores in data parallelism. Further, in an experimental example of the present disclosure, the created execution time was considered as the highest level to give various QoS levels to synthetic benchmarks, and the execution time of lower levels may be modeled using the following Formula 1.

Description About Power Modeling and a QoS of Stereo-Vision is as Follows.

Multiple QoS levels in a stereo-vision application may be interpreted as the degrees of how accurately the present apparatus 100 can estimate a depth map. In other words, the present apparatus 100 can immediately change the resolution of images in various ways in accordance with how accurate result is required.

In the present apparatus 100, when it is definitely determined that considerable obstacles are not found in a scene, it may be preferable to reduce the resolution of block matching (BM) input. However, when any considerable obstacle is found in a scene, the present apparatus 100 may increase resolution to elaborate the depth map obtained with higher precision. This decision may be made in the mode decision process that is the final task shown in (b) of FIG. 6.

In the present apparatus 100, for example, it is possible to consider five different resolutions as available QoS levels. A QoS level 1 ($l_1$) may have resolution of 320×240, a QoS level 2 ($l_2$) may have resolution of 384×288, a QoS level 3 ($l_3$) may have resolution of 480×320, a QoS level 4 ($l_4$) may have resolution of 600×480, and a QoS level 5 ($l_5$) may have resolution of 640×480.

In this case, the control unit 130 of the present apparatus 100 may control an unmanned flying object to operate in a mode corresponding to the QoS level 1 ($l_1$) that is a mode having the lowest resolution of the five QoS levels when it is determined that all pixels in a depth map extracted by the depth map extractor (not shown) have pixel values between 0 and 55 as the result of analyzing the depth map (i.e., a depth map for scenes obtained from the unmanned flying object). This may mean that an obstacle was not found around the unmanned flying object while the flight of the unmanned flying object is controlled.

Further, the control unit 130 of the present disclosure 100 may control an unmanned flying object to operate in a $l_2$ mode of a QoS level of 2 from the current mode (that is, the $l_1$ mode of a QoS level of 1) when it is analyzed that at least one pixel of pixels in a depth map for scenes obtained in real time has a pixel value between 56 to 105 as the result of analyzing the depth map.

Similarly, the control unit 130 may control an unmanned flying object to operate in an $l_3$ mode of a QoS level of 3 from the current mode when it is analyzed that at least one pixel of pixels in a depth map for scenes obtained in real time has a pixel value between 106 to 155 as the result of analyzing the depth map. In other words, the control unit 130 may trigger a state transition into the $l_3$ mode of a QoS level of 3 when at least one pixel of pixels in a depth map has a pixel value between 106 and 155.

Further, the control unit 130 may trigger a state transition into an $l_4$ mode of a QoS level of 4 when at least one pixel of pixels in a depth map has a pixel value between 156 and 205.

If not so, the control unit 130 may trigger a state transition into a mode corresponding to a QoS level 5 ($l_5$) that is a mode having the highest resolution. In other words, the control unit 130 may control an unmanned flying object to operate in an $l_5$ mode of a QoS level of 5 from the current mode when it is analyzed that at least one pixel of pixels in a depth map for scenes obtained in real time has a pixel value between 206 to 255 as the result of analyzing the depth map. That is, when at least one pixel of pixels in a depth map has a pixel value between 206 and 255, the control unit 130 may perform the $l_5$ mode having the highest QoS level.

In an experiment of the present disclosure, execution time of stereo match was repeatedly measured with five different resolutions.

According to the QoS models, that is, the system models proposed above in the present disclosure, the QoS levels 1 may be considered as elements of {320×240, 384×288, 480×320, 600×480, 640×480} in the present apparatus 100.

Figure 7:
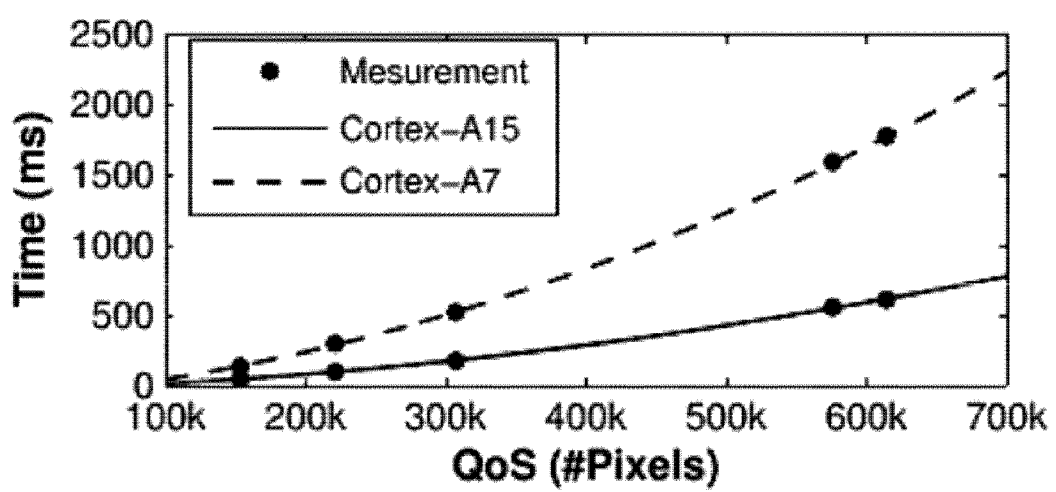
FIG. 7 is a diagram showing how execution time of a stereo match increases in accordance with a QoS level as an experimental example of the present disclosure.

FIG. 7 is a diagram showing how execution time of a stereo match increases in accordance with a QoS level as an experimental example of the present disclosure. That is, FIG. is a diagram showing execution time of stereo match at various QoS levels.

Referring to FIG. 7, in the assumption of a workload model, exec that is execution time may be expressed as a function in which the QoS levels monotonously increase at all big and little cores. An exec function of two kinds of cores (a big core and a little core) may be approximated in a quadratic polynomial as in the following Formula 1 on the basis of measured information in an experimental example of the present disclosure.

$$\mathrm{exec}(l)_{SM,big} = 1.2 \cdot 10^{-9} \cdot l^2 + 0.00031 \cdot l - 22$$

$$\mathrm{exec}(l)_{SM,little} = 3.4 \cdot 10^{-9} \cdot l^2 + 0.00092 \cdot l - 75 \qquad [\text{Formula 1}]$$

Further, in an experimental example of the present disclosure, power models of big and little cores were empirically derived through repeated measurement.

As for a big core, $p_c^{dyn}$ may be 1.75 Watts, $p_c^{stat}$ may be 0.25 Watts, and $p_c^{idle}$ may be 0.21 Watts. On the contrary, as for a little core, $p_c^{dyn}$ may be 0.145 Watts, $p_c^{stat}$ may be 0.045 Watts, and $p_c^{idle}$ may be 0.0362 Watts.

In an experimental example of the present disclosure, it was shown that $p_c^{idle}$ considerably decreased when all of same type cores are turned off in target architecture. That is, it was shown that when four big cores were all turned off, for example, the four big cores each consume 0.0425 Watts as $p_c^{idle}$. In this case, since an OS kernel is executed at little cores, it may be impossible to turn off all four little cores.

How a stereo-vision application adjusts mapping in correspondence to QoS requirements in order to minimize power consumption is described hereafter in connection with QCPM.

Figure 8:
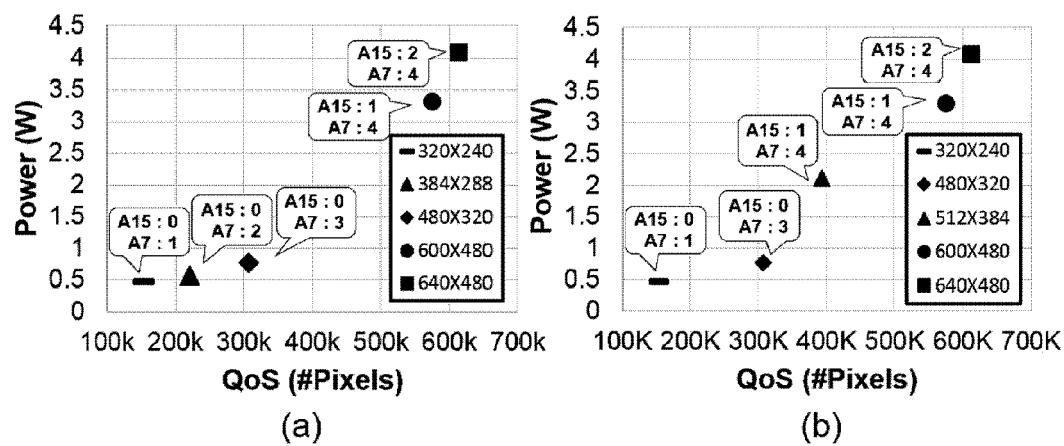
FIG. 8 is a diagram showing an individual mapping optimization result of stereo-visions having different levels for each of QCPM and PCQM as an experimental example of the present disclosure.

FIG. 8 is a diagram showing an individual mapping optimization result of stereo-visions having different levels for each of QCPM and PCQM as an experimental example of the present disclosure. In particular, (a) of FIG. 8 shows an individual mapping optimization result of five stereo-visions having different QoS levels for QCPM and (b) of FIG. 8 shows an individual mapping optimization result of five stereo-visions having different power budget levels for PCQM. In FIG. 8, A15 may mean big cores and A7 may mean little cores.

Figure 9:
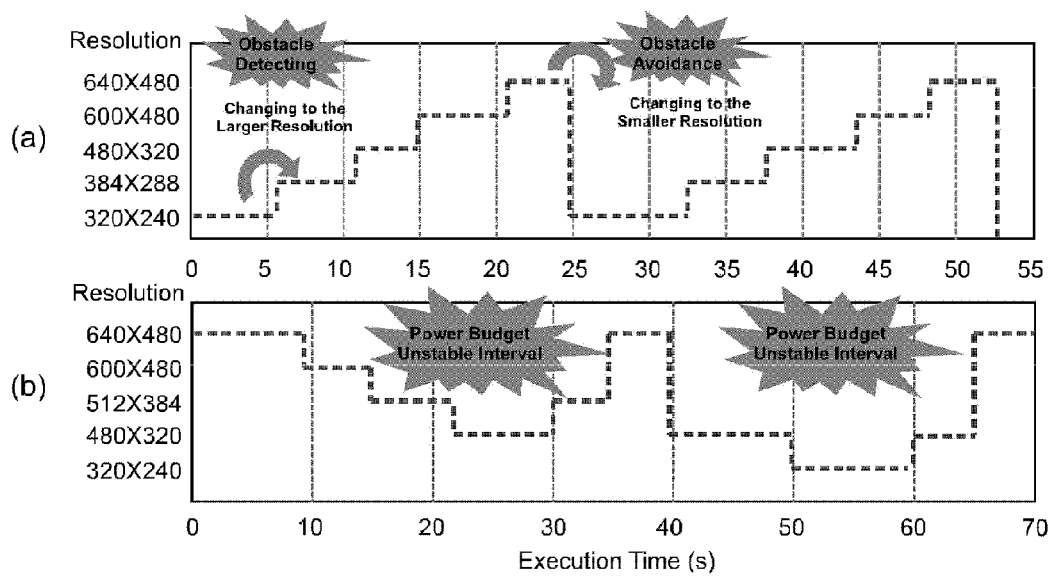
FIG. 9 is a diagram showing an example of runtime adaptation scenarios in each of QCPM and PCQM that are applied to stereo-visions as an experimental example of the present disclosure.

Further, FIG. 9 is a diagram showing an example of runtime adaptation scenarios in each of QCPM and PCQM that are applied to stereo-visions as an experimental example of the present disclosure. In particular, (a) of FIG. 9 shows an example of a runtime adaptation scenario of QCPM applied to a stereo-vision. (b) of FIG. 9 shows an example of a scenario of runtime power budget variation of PCQM applied to a stereo-vision.

Referring to (a) of FIG. 8, as for the lowest resolution, optimal mapping may be obtained when one little core is used, and the power consumption in a corresponding mapping solution may be 0.47 Watts. In contrast, as for the highest resolution, two big cores and four little cores may be used to satisfy a timing constraint, and in this case, power consumption of 4.08 Watts may be generated.

Referring to (a) of FIG. 9, it was shown that a stereo-vision algorithm was executed for about 53 seconds in a specific flight scenario, in which a change in QoS level occurred nine times. A comparison result of the approach proposed in the present disclosure about fixed level optimization is shown in (a) of FIG. 10.

That is, FIG. 10 is a diagram showing comparison of an adaptive approach about fixed mode executions for QCPM and PCQM as an experimental example of the present disclosure. In particular, (a) of FIG. 10 shows comparison of approach proposed in the present disclosure about fixed level optimization in connection with QCPM. Further, (b) of FIG. 10 shows a comparison result about a fixed power budget in connection with PCQM.

Referring to (a) of FIG. 10, the average power consumption that is applied to the present apparatus 100 may be 1.74 Watts. The present apparatus 100 may flexibly change modes into corresponding modes fitting various tasks and necessary requirements, so it is possible to save power of 57.35% in comparison to the case when the $l_5$ mode having the highest resolution is always maintained.

Further, as shown in $l_1$ to $l_3$, it can be seen that the sum of the number of all pixels that are processed per frame considerably decreases when a low QoS is maintained. The possibility of a severe obstacle occurring may be high in detection of obstacles when the present apparatus operates in a mode having low resolution than when the present apparatus operates in a mode having high resolution.

In order to prove general applicability and scalability of the technique proposed by the present apparatus 100, three synthetic benchmarks indicated by #10, #50, and #100 in (a) of FIG. 10 were tested through the same scenario in an experimental example of the present disclosure. Mode switching in an experiment of the present disclosure may be considered being as the same as a stereo-vision. As the result of experiment, a similar tendency was observed in the synthetic benchmarks, as shown in (a) of FIG. 10.

Meanwhile, description about an experimental example in which runtime power budget was changed in association with PCQM is as follows.

In an experimental example of the present disclosure, 4.5, 4.0, 3.0, 2.0, and 0.5 Watts were applied as five power budgets at an optimized part (part 1) by the creating unit 110. A result of performing individual mapping optimization on different power budgets is shown in (b) of FIG. 8.

Referring to (b) of FIG. 8, only one little core is used at the lowest power budget in PCQM, similar to QCPM, so an optimized QoS that is 320×240 may be obtained in this case. In contrast, as for 4.5 Watts that is the highest power budget, two big cores and four little cores are used, so a maximum QoS that is 640×480 may be obtained.

Referring to (b) of FIG. 9, it was shown that a stereo-vision algorithm was executed for about 70 seconds in a specific flight scenario, in which a change in power budget (power budget level) occurred ten times. As described above, pre-calculated mapping may be adaptively applied to cases when a change in power budget occurs, as shown in (b) of FIG. 8. Similarly, pre-calculated mapping may be adaptively applied to cases when a change in QoS level occurs, as shown in (a) of FIG. 8.

That is, the present apparatus 100 may compute (calculate) and store in advance modified DF & mapping information for each of a plurality of states in the database as the result of optimized original dataflow through a design time optimization process by the creating unit 10 and the optimizing unit 120. In other words, pre-computed modified DFs & mapping information by the creating unit 110 and the optimizing unit 120, that is, modified DFs & mapping information computed (calculated) in advance for each of a plurality of system states (1, 2, n−1, n) may have been stored in the database 30.

Thereafter, when a change in power budget (a change in power budget level) occurs in association with PCQM, the control unit 130 may adaptively change and apply modified dataflow and mapping information corresponding to the cases when a change occurs, every time a change in power budget occurs, on the basis of the information computed and stored in advance in the database 30 (i.e., modified dataflow and mapping information for each of a plurality of system states).

Similarly, when a change in QoS level occurs in association with QCPM, the control unit 130 may adaptively change and apply modified dataflow and mapping information corresponding to the cases when a change occurs, every time a change in QoS level occurs, on the basis of the information computed and stored in advance in the database 30 (i.e., modified dataflow and mapping information for each of a plurality of system states). In other words, every time a change in QoS level occurs, the control unit 130 may extract and apply modified dataflow and mapping information corresponding to the changes from the database 30 (that is, extract from modified dataflow and mapping information for each of a plurality of system states computed and stored in advance in the database) to an unmanned flying object.

Meanwhile, a comparison result of fixed power budget cases is shown in (b) of FIG. 10, in which a similar tendency to QCPM was observed in PCQM.

Referring to (b) of FIG. 10, in the technique proposed in the present apparatus 100, it is shown that the average power consumption considerably decreased as compared with the case having the highest power budget (in which there is power reduction of 51.47% in a stereo-vision and about 48% to 53% in a combination example).

Further, the technique proposed in the present apparatus 100 may always provide a better QoS per frame in consideration of a power budget, as compared with when it operates at a lower fixed power budget level.

Detailed Description About Mode Switching is as Follows.

Synchronous mode switching was considered in the previous experimental example of the present disclosure. That is, the case when a new task is activated only when a previous task is completely paused was considered in the previous experimental example. These transition overheads may be considerably important elements.

It was shown that the average switching time was 193.6 ms in QCPM of a stereo-vision, which may mean that two frames are lost from one frame in each transition. This may be considered as being worthy of stating in that the average power consumption of a stereo-vision is actually measured instead of being estimated in a model. This means that a mode switching overhead not definitely modeled in optimization is considered in estimation and the adaptive approach proposed in the present apparatus 100 is still useful even in synchronous switching. In the present apparatus 100, it is possible to considerably reduce the average switching time of a stereo-vision to 18.1 ms in QCPM by enabling asynchronous switching.

As described above, the present disclosure proposes a context-aware adaptive optimization technique of a dataflow application suitable for a multicore embedded system through the present apparatus 100.

The present disclosure 100 may consider runtime dynamic factors such as various QoS requirements or fluctuating power budgets in offline optimization of a multicore embedded system through the technique proposed in the present apparatus 100. Further, the present disclosure proposes two types of switching methods (synchronous/asynchronous switching methods) to increase efficiency of mode switching.

Further, efficiency of the technique proposed in the present apparatus 100 was proved in the previous experiment of the present disclosure through not only the synthetic dataflow benchmarks, but the actual case study about design for an unmanned flying object and optimization of a computer vision. The technique provided in the present apparatus 100 provides an appropriate compromise plan for tradeoff between a QoS and power consumption.

Hereafter, the operation flow of the present disclosure is briefly examined on the basis of the above-detailed description.

Figure 11:
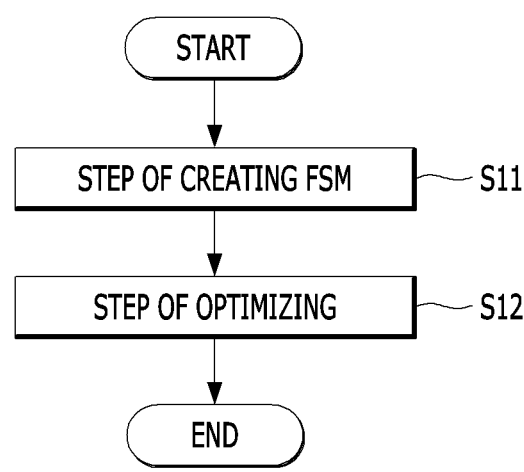
FIG. 11 is an operational flowchart of a dataflow optimization method for low-power operation of a multicore system according to an embodiment of the present disclosure.

FIG. 11 is an operational flowchart of a dataflow optimization method for low-power operation of a multicore system according to an embodiment of the present disclosure.

The dataflow optimization method for low-power operation of a multicore system shown in FIG. 11 may be performed by the present apparatus 100 described above. Accordingly, the above description about the present apparatus 100, even if it was omitted, may be equally applied to the description about the dataflow optimization method for low-power operation of a multicore system.

Referring to FIG. 11, an FSM including a plurality of system states may be created in consideration of dynamic factors that trigger a transition in system state for original dataflow composed of a plurality of tasks in step S11.

The dynamic factors may be factors about at least one of a QoS change and a power budget change.

Further, in step S11, it is possible to create system states included in an FSM as many as the number of QoS levels if the type of an optimization problem is QCPM (QoS-Controlled-Power-Minimization), and may create system states included in the FSM as many as the number of power budget levels if the type of an optimization problem is PCQM (Power-Constrained-QoS-Maximization).

Further, in step S11, it is possible to create an FSM such that a state transition (a transition in system state) is possible between adjacent system states under the assumption that a plurality of system states included in the FSM are sequentially arranged in accordance with the level of QoS level and/or power budget level.

Next, in step S12, it is possible to optimize original dataflow through optimization of the created FSM in step s11.

Further, step S12 may include; a step of mapping each of a plurality of tasks corresponding to the FSM created in step S11 to at least one core of multiple cores; and a step of scheduling the tasks mapped to the multiple cores to satisfy predetermined conditions.

In this case, the predetermined conditions may be conditions that minimize power consumption if the type of an optimization problem is QCPM (QoS-Controlled-Power-Minimization), and may be conditions that maximize a QoS level in association with a power budget if the type of an optimization problem is PCQM (Power-Constrained-QoS-Maximization).

Further, the predetermined conditions may further include a condition that sets latency to be predetermined time or less in parallelizing the tasks scheduled through the multiple cores.

Further, though not shown in the drawings, the dataflow optimization method for low-power operation of a multicore system according to an embodiment of the present disclosure may include a step of providing a response to a change in system state on the basis of original dataflow optimized in step S12 during runtime.

The information about the original dataflow optimized in step S12 may be stored in a database. Accordingly, in the step of providing a response, the control unit 130 may provide a response to a change in system state to an unmanned flying object on the basis of the information about the optimized original dataflow stored in the database in advance (i.e., modified dataflow and mapping information for each of a plurality of system states).

The unmanned flying object may be controlled on the basis of the response to a change in system state provided by the control unit.

In the above description, steps S11 and S12 may be further divided into additional steps or combined in fewer steps, depending on embodiments of the present disclosure. Further, some steps may be omitted, and the order of steps may be changed, if necessary.

The dataflow optimization method for low-power operation of a multicore system according to an embodiment of the present disclosure may be implemented in the form of a program command, which may be performed through various computer units, and may be recorded on computer-readable media. The computer-readable media may include program commands, data files, and data structures individually or in combinations thereof. The program commands that are recorded on the media may be those specifically designed and configured for the present disclosure or may be those available and known to those engaged in computer software in the art. The computer-readable recording media include magnetic media such as hard disks, floppy disks, and magnetic media such as a magnetic tape, optical media such as CD-ROMs and DVDs, magneto-optical media such as floptical disks, and hardware devices specifically configured to store and execute program commands, such as ROM, RAM, and flash memory. The program commands include not only machine language codes compiled by a compiler, but also high-level language code that can be executed by a computer using an interpreter, etc. The above-described hardware device may be configured to operate as one or more software modules to perform the operation of the present disclosure, and vice versa.

Further, the dataflow optimization method for low-power operation of a multicore system according to an embodiment of the present disclosure described above may be implemented also in the type of a computer program or an application that is stored in recording media and executed by a computer.

The above description is provided as an exemplary embodiment of the present disclosure and it should be understood that the present disclosure may be easily modified in other various ways without changing the spirit or the necessary features of the present disclosure by those skilled in the art. Therefore, the embodiments described above are only examples and should not be construed as being limitative in all respects. For example, the components described as a single part may be divided and the components described as separate parts may be integrated.

The scope of the present disclosure is defined by the following claims rather than the detailed description, and all of changes and modifications obtained from the meaning and range of claims and equivalent concepts should be construed as being included in the scope of the present disclosure.

What is claimed is:

1. A dataflow optimization method for low-power operation of a multicore system, the dataflow optimization method comprising steps of:
    creating a Finite State Machine (FSM) including a plurality of system states in consideration of dynamic factors that trigger a transition between system states for an original dataflow composed of a plurality of tasks, the dynamic factors indicating events that trigger the transition between the system states, wherein the dynamic factors are factors related to at least one of a Quality of Service (QoS) change and a power budget change, and wherein the plurality of system states are sequentially arranged in accordance with a QoS level or a power budget level;
    optimizing the original dataflow through optimization of the created FSM and storing the optimized original dataflow in a database; and
    in response to detecting a change in system state during runtime, controlling an unmanned flying object to autonomically adapt by extracting a response to the change in system state on the basis of the optimized original dataflow stored in the database, and providing the response to the unmanned flying object,
    wherein the step of creating further comprises creating the FSM such that a state transition is possible only between adjacent system states among the plurality of system states that were sequentially arranged,
    wherein the step of optimizing further comprises:
        mapping each of the plurality of tasks corresponding to the created FSM to at least one core of multiple cores to decide candidate mapping information; and
        determining whether predetermined conditions are satisfied by applying a priority-based list-scheduling to the plurality of tasks mapped to the multiple cores, and deciding the candidate mapping information as a final mapping information when the predetermined conditions are satisfied as a result of the determination,
    wherein in the step of mapping, each task of the plurality of tasks is designated with at least one slot among slots of the multiple cores as many as a maximum parallelism degree of the each task of the plurality of tasks, and
    wherein the predetermined conditions include a condition that sets latency to be a predetermined time or less in parallelizing the plurality of tasks scheduled through the multiple cores.

2. The dataflow optimization method of claim 1, wherein the creating step is to create the system states included in the FSM as many as the number of QoS levels if a type of an optimization problem is QCPM (QoS-Controlled-Power Minimization) in which power consumption is to be minimized in connection with a QoS level, and
    to create the system states included in the FSM as many as the number of power budget levels if the type of optimization problem is PCQM (Power-Constrained-QoS-Maximization) in which a QoS level is to be maximized in connection with the power budget.

3. The dataflow optimization method of claim 1, wherein, in the step of determining, the predetermined conditions are conditions that minimize power consumption if a type of an optimization problem is QCPM (QoS-Controlled-Power-Minimization), and are conditions that maximize a QoS level in association with the power budget if the type of the optimization problem is PCQM (Power-Constrained-QoS-Maximization).

4. The dataflow optimization method of claim 1, wherein the latency indicates a time difference between start of a first task among the plurality of tasks and completion of a last task among the plurality of tasks.

5. A dataflow optimization apparatus for low-power operation of a multicore system, the dataflow optimization apparatus comprising:
    a processor; and
    a memory storing instructions executable by the processor,
    wherein the processor is configured to:
    create a Finite State Machine (FSM) including a plurality of system states in consideration of dynamic factors that trigger a transition between system states for an original dataflow composed of a plurality of tasks, the dynamic factors indicating events that trigger the transition between the system states, wherein the dynamic factors are factors related to at least one of a Quality of Service (QoS) change and a power budget change, and wherein the plurality of system states are sequentially arranged in accordance with a QoS level or a power budget level;

optimize the original dataflow through optimization of the created FSM and store the optimized original dataflow in a database;

in response to detecting a change in system state during runtime, control an unmanned flying object to autonomically adapt by extracting a response to the change in system state on the basis of the optimized original dataflow stored in the database, and provide the response to the unmanned flying object, wherein the processor is further configured to create the FSM such that a state transition is possible only between adjacent system states among the plurality of system states that were sequentially arranged, wherein the processor is further configured to:
map each of the plurality of tasks corresponding to the created FSM to at least one core of multiple cores to decide candidate mapping information; and
determine whether predetermined conditions are satisfied by applying a priority-based list-scheduling to the plurality of tasks mapped to the multiple cores, and decide the candidate mapping information as a final mapping information when the predetermined conditions are satisfied as a result of the determination, wherein in the mapping, each task of the plurality of tasks is designated with at least one slot among slots of the multiple cores as many as a maximum parallelism degree of the each task of the plurality of tasks, and wherein the predetermined conditions include a condition that sets latency to be a predetermined time or less in parallelizing the plurality of tasks scheduled through the multiple cores.

6. The dataflow optimization apparatus of claim 5, wherein the predetermined conditions are conditions that minimize power consumption if a type of an optimization problem is QCPM (QoS-Controlled-Power-Minimization), and are conditions that maximize a QoS level in association with the power budget if the type of the optimization problem is PCQM (Power-Constrained-QoS-Maximization).

7. The dataflow optimization apparatus of claim 5, wherein the latency indicates a time difference between start of a first task among the plurality of tasks and completion of a last task among the plurality of tasks.

8. The dataflow optimization apparatus of claim 5, wherein the processor is further configured to:
create the system states included in the FSM as many as the number of QoS levels if a type of an optimization problem is QCPM (QoS-Controlled-Power-Minimization) in which power consumption is to be minimized in connection with a QoS level, and
create the system states included in the FSM as many as the number of power budget levels if the type of the optimization problem is PCQM (Power-Constrained-QoS-Maximization) in which a QoS level is maximized in connection with the power budget.

* * * * *